Nov. 8, 1955  C. E. GILBERT  2,723,327
LINE CORD SWITCH

Filed Dec. 26, 1950  2 Sheets-Sheet 1

INVENTOR
CHARLES E. GILBERT
BY *Darby & Darby*
ATTORNEYS

Nov. 8, 1955  C. E. GILBERT  2,723,327
LINE CORD SWITCH
Filed Dec. 26, 1950  2 Sheets-Sheet 2
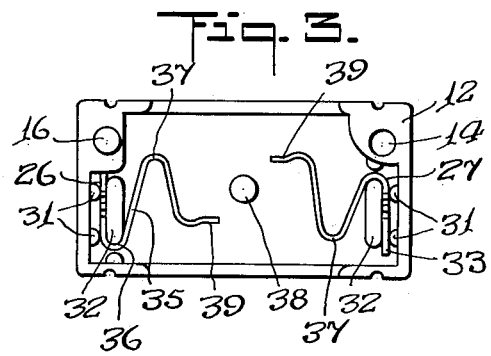
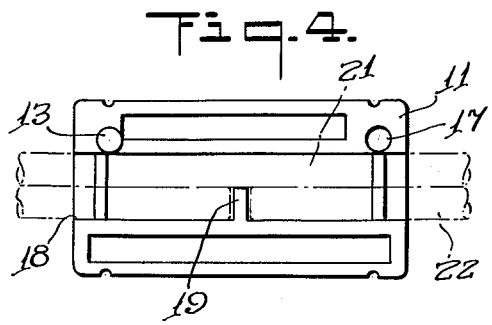
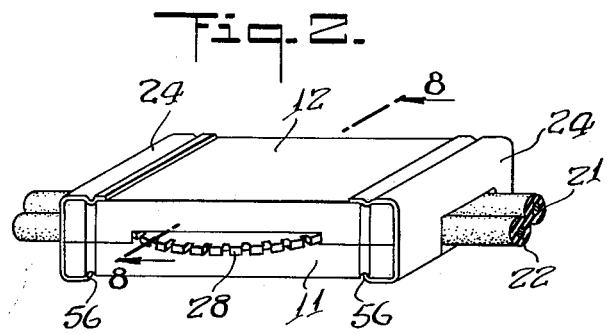
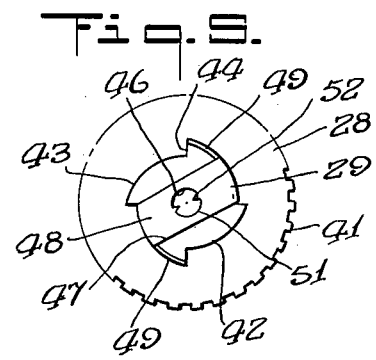
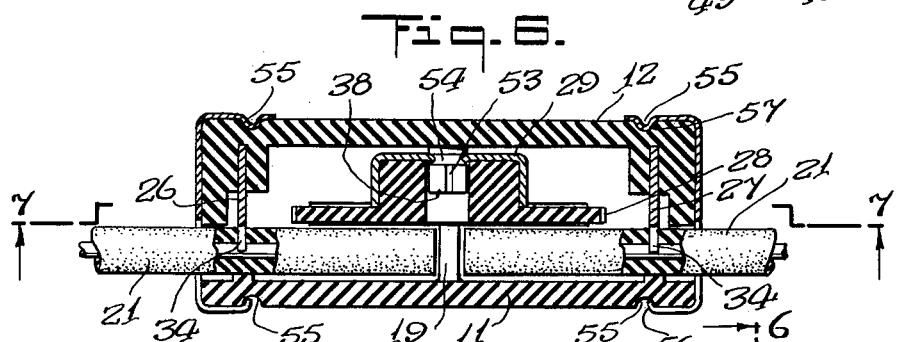
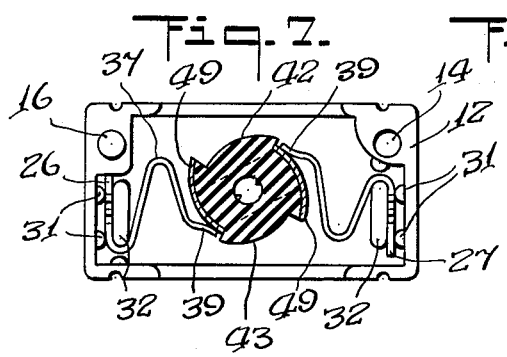
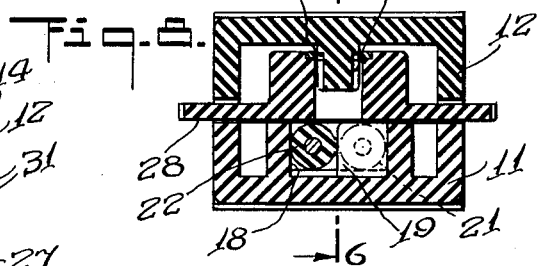
INVENTOR
CHARLES E. GILBERT
BY Darby & Darby
ATTORNEYS

UNITED STATES PATENT OFFICE 2,723,327
Patented Nov. 8, 1955

2,723,327

LINE CORD SWITCH

Charles E. Gilbert, New York, N. Y., Margaret Doris Gilbert, Norman Coates and The Chase National Bank of the City of New York executors of said Charles E. Gilbert, deceased Application December 26, 1950, Serial No. 202,782

5 Claims. (Cl. 200—168)

The present invention pertains to the art including electric switches, and more particularly to switches which may be interposed along the length of a line cord.

In many electrical appliances, it is inconvenient or undesirable to include a switch with the appliance itself and in such cases it has become customary to interpose a switch in the line cord connecting the appliance to the power outlet or receptacle. Up to the present time, such line cord switches have been relatively complex, both in fabrication and assembly, in that they require a considerable number of parts and for assembly it has been necessary to cut the line cord, to strip both ends of each of the two wires of the cord as thus cut, to twist the strands of these four ends, and to assemble each of these four ends with the line switch, usually by the use of individual screws or binding posts.

Applicant's device on the other hand provides a line cord switch having a very small number of easily fabricated parts, all of which are produced by either molding or stamping, and which eliminates completely any screws or building posts and facilitates assembly with a line cord by eliminating the necessity of baring or stripping any conductors. In fact, the switch according to the present invention can be readily assembled with a line cord with no special tools, requiring, for example, only a pair of scissors or a cutter for cutting but one conductor of the line cord. No other stripping or twisting of strands or clamping with a screw driver or pliers becomes necessary, and assembly can be readily made by the ordinary purchaser or non-skilled worker.

Accordingly, it is an object of the present invention to provide a simplified line cord switch less expensive to fabricate and more readily attachable to a line cord.

It is another object of the present invention to provide an improved line cord switch made up solely of molded or stamped parts and which requires no special tools for assembly or attachment to a line cord.

It is still another object of the present invention to provide an improved line cord switch in which the assembly of the switch is accomplished simultaneously with the attachment of the switch to a line cord.

According to the present invention, the line cord switch is formed of two sub-assemblies, one containing a channel in which a line cord may be laid after one conductor thereof is severed into two parts, and the other comprising a combined housing portion, pair of contacts and rotatable adjustable shorting member adapted to electrically connect the contacts in one position and to disconnect them from one another in the other position. In addition, the contacts carry integral points or prongs which, upon the assembly of the two portions of the switch merely by laying one on the other and clipping them together by simple clips, pierce the insulation of the severed wire portions to make contact between each of said severed wire portions and a respective contact. Accordingly, when the shorting member interconnects the contacts, the two severed wired portions become electrically connected and, conversely, when the shorting member insulates the two contacts, the severed wire portions are disconnected. The non-severed wire of the line cord passes straight through the line cord switch without alteration so that the flow of electric current is placed completely under the control of the shorting member. The only operations needed for assembly and attachment of the switch on the line cord are thus severing one wire, laying the wire in its channel, placing the two switch portions together, and placing the clips over them.

Other features and advantages of the present invention will become more apparent from consideration of the following description of a preferred embodiment thereof, taken in conjunction with the appended drawings, in which Figure 1 is a perspective exploded view of the line cord switch of the present invention in association with a line cord;

Figure 2 is a perspective view of a line cord switch assembled with a line cord;

Figure 3 is a plan view of one housing portion of the line switch together with the contact members assembled therein;

Figure 4 is a plan view of the other switch housing portion illustrating its manner of assembly with a line cord;

Figure 5 is a plan view of the shorting member and the switch-actuating member carrying it;

Figure 6 is a longitudinal cross-sectional view of the line cord switch assembled with a line cord, viewed along line 6—6 of Fig. 8;

Figure 7 is another longitudinal cross-sectional view of the switch taken along the line 7—7 of Fig. 6; and Figure 8 is a transverse cross-sectional view of the line cord switch and cord assembly taken along line 8—8 of Figure 2 and of Figure 6.

Figure 1:
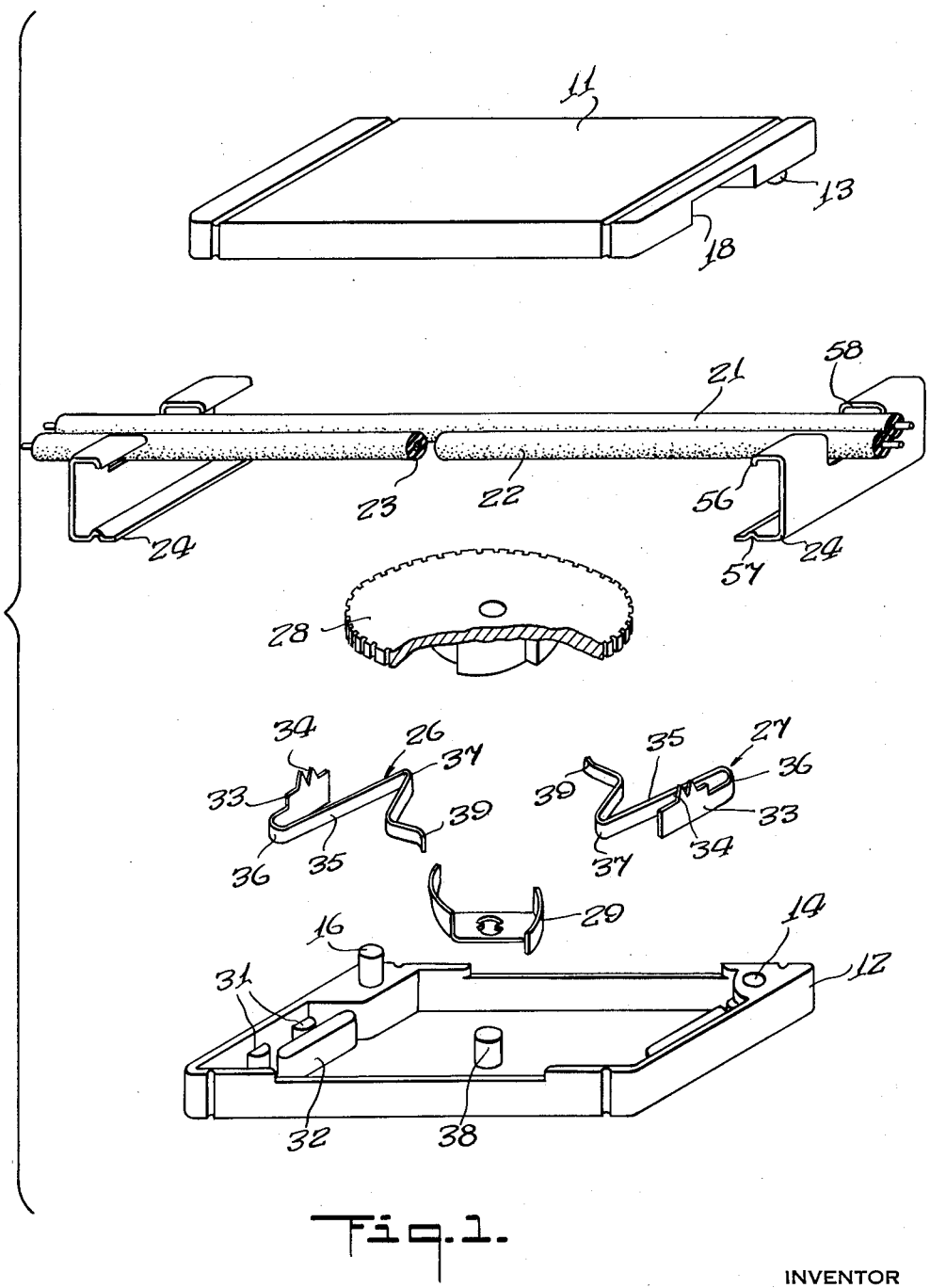

Referring to the drawings, the line cord switch comprises a first housing portion 11 and a second housing portion 12, each formed of insulating material, preferably by molding. Housing portion 11 has a projecting locating post 13 which cooperates with a locating hole 14 in housing portion 12 and similarly, housing portion 12 has a projecting locating post 16 which cooperates with a locating hole 17 in housing portion 11. Upon assembly of these two housing portions, they are laid on one another with the locating post of each seated in the locating hole of the other, and in this way it is assured that these two housnig portions 11 and 12 can be assembled only in one relative position, in which their interiors properly communicate with one another as described below.

As shown most clearly in Figures 1 and 4, housing portion 11 has a cord-receiving channel 18 extending longitudinally of the length thereof and substantially centrally thereof, which is intended to receive a conventional twin-conductor line cord such as of the conventional rubber-covered type. Substantially centrally of the length of the housing portion 11 is a partition 19 extending transversely of channel 18 across one half thereof. As is seen in Figures 1 and 4, the line conductor cord 21 has its conductor 22 severed as indicated at 23, by any suitable means. The cord is laid in the channel 18 with the two severed parts of conductor 22 on either side of the partition 19, which thereby serves to insulate these ends from direct electrical contact with one another. It will be understood that it is not necessary to cut out a length of conductor 22, but merely to sever it into two parts. The two severed portions can then be separated readily by the small distance represented by the thickness of the partition 19. However, if desired, a short length of conductor 22 can be cut away of a length substantially equal to or slightly longer than the longitudinal dimension of partition 19.

The remaining elements of the switch (except for the clips 24 to be described) form a separate sub-assembly. These elements include the second housing portion 12, a pair of contact members 26, 27, an actuating member 28 and a short-circuiting member 29 carried by actuating member 28. Contact members 26 and 27 are formed of metallic electrically conductive material, preferably resilient in character, such as hardened brass, spring copper or Phosphor bronze. Each of these contact members 26 and 27 has a straight portion 33 at one end carrying points or prongs 34 extending coplanarly and transversely of the straight portion 33. Adjoining the straight portion 33 is a second straight portion 35 joined to the straight portion 33 by a bend of substantially 180° shown at 36. A second bend 37 occurs at the other end of the second straight portion 35 and is joined to the contact portion 38 of these members 26 and 27.

Housing portion 12 is formed with projections 31 and 32 at each end, which are spaced by substantially the thickness of the contact member 26, 27 and retain the straight and pointed portion 33, 34 positioned between projections 31 and 32, as by a pressed fit, although the contact members 26, 27 may fit loosely between the projections where desired. In this way the points 34 are properly located so that when the housing portions 11 and 12 are assembled by their locating pins and holes, the points 34 overlie the respective portions of the severed conductor 22.

The housing portion 12 also has formed therein a center post 38 which forms the axle or spindle for the actuating member 28. The member 28 is formed with a relatively thin circular disk portion 41 having a smaller diameter axial extension 42 which is formed by a series of four 90° spirals 43, each joined to the next by a substantially radial offset 44. Also the member 28 is provided with a bore 46 providing a rotatable fit with post 38 of housing portion 12. Extending diametrically across the face of the portion 42 of the actuating member 28 is a shallow channel 47 which receives the shorting member 29 with a pressed fit. Shorting member 29, as shown in Figure 5 in its position within channel 47, has a straight flat portion 48 which seats in channel 47. It also has arcuate transverse end pieces 49 extending perpendicularly to or edgewise to the plane of the straight portion 48 and curved to conform to two opposite ones of the spiral edges 43 of the actuating member portion 42. In this way the assembly of the actuating member 28 and the shorting member 29 provides a series of four cylindrico-spiral surfaces on the extension 42 of the actuating member 28, two opposite ones of which are covered by the portions 49 of the shorting member 29 while the other two opposite ones are formed by the insulating surface 43.

It will thus be apparent that, upon placing the assembly of actuating member 28 and shorting member 29 on the post 38 of the housing member 12, the ends 39 of the contact members 26, 27 will, as shown in Figure 7, in one position of the actuating member 28 rest upon the metallic extensions 49 of the shorting member 29 whereby the two contact members 26, 27 are interconnected by the shorting member 29. Upon rotating the actuating member 28 through about ninety degrees, the contact member ends 39 will now bear upon the insulating surfaces 43 of the actuating member 28 and will be relatively disconnected from one another. As shown in Figures 1 and 2, the sides of housing portion 12 are recessed at 49 to permit the disk 41 of the actuating member 28 to project beyond the housing for ready rotation by the user. To facilitate rotation, the edges of disk 41 may be knurled or grooved to increase friction.

The particular spiral configuration of the surfaces on which the contact members 39 bear provides two advantages. First, as the switch changes from a condition of conduction to a condition of disconnection or vice versa, the resilient ends of the spring members snap radially inwardly through the distance of the radial extension 44, thereby producing an audible click to serve to indicate to the operator that the switch has changed its condition. At the same time, reverse rotation of the actuating member 28 is prevented since the ends 39 of the contact members then jam into the radial extensions 44 on the actuating member 28.

To retain the actuating member 28, shorting member 29 and contact members 26, 27 assembled on the post 38 of housing portion 12, the shorting member 29 is provided with an aperture 51 registering with the bore 46 in the actuating member 28, except that shorting member 29 has a pair of pointed projections 52 extending inwardly of the aperture 51. The post 38 is preferably integrally formed with the housing portion 12 of a suitable insulating material satisfactory for molding, which is generally relatively soft as compared with metal.

In assembly, after the contact members 26, 27 are put in position, the shorting member 29 is placed on the actuating member 28, the grooved arms 49 of the shorting member having enough resilience to cause them to grip the spiral surfaces 43 of the actuating member 28 in a good frictional engagement. Thereupon the assembly of these two elements is pressed over the post 38, with the contact members 26, 27 temporarily bent out of the way. In so doing, the points 51 score a groove 53 (shown in Figure 6) longitudinally of post 38 until the actuating member 28 is fully seated on the post 38. Then by rotating the actuating member 28 a circular groove 54 is formed in the post 38. This groove 54 serves to retain the actuating member 28 on the post 38 as desired, since the member 28 can be removed only forcibly unless the points 51 register with the groove 53.

The connection of the present switch with a line cord is now fairly obvious. The conductor cord, with one conductor cut as mentioned above, is laid in channel 18 of housing portion 11 and the other housing portion 12, assembled with elements 26, 27, 28 and 29 as just described is placed together with portion 11, with the locating pin of each in the locating hole of the other. It will be understood that the points 34 of the two contact members are now in alignment with one another and overlie the two portions of the cut conductor 22. Upon pressing the two housing portions together, the points 34 pierce the insulation of the two portions of conductor 22 and make electrical contact between each of the contact members 26, 27 and a respective one of the two cut portions of conductor 22.

The two housing portions 11 and 12 are retained in this position by the clips 24 which are formed of resilient material such as spring metal. As shown in Figures 1 and 6, each of the housing portions 11 and 12 is formed with a transverse groove 55 parallel to but spaced from its ends. The spring clip 24 is formed with an inwardly turned end 56 which seats in one of the grooves 55 and a rib 57 which snaps into place in an opposite groove 55. Also, the spring clips 24 have a cutaway portion 58 permitting passage of the conductor cord 21 therethrough. Upon thus assembling the apparatus, it is completely ready for use.

A line switch of the present type may be sold separately from the conductor cord, in which case it may be sold in four separate portions, namely the sub-assembly shown in Figure 7, the housing portion 11 and the two clips 24, which may be separate or assembled together without the conductor cord; it being understood, if they are assembled, that before applying the conductor cord, the spring clips 24 are removed. The purchaser, therefore, to assemble the conductor cord on the switch, merely cuts one conductor of the cord, lays the cord in housing portion 12 and its sub-assembly in cooperating relationship to housing portion 11, and applies the spring clips 24 at each end thereof. The assembly of the switch and its connection to the cord are thus of the utmost simplicity and the switch itself may be fabricated very inexpensively since its parts are either molded, or are stamped from sheet metal.

It will be understood that many other forms of clip 24 or other elements may be used in the present switch. The above is a description of merely one illustrative form of the invention, which is not limited solely to the form shown, but is defined by the following claims.

I claim as my invention:

1. A switch adapted for connection intermediate the ends of a two-conductor line, comprising a housing having two portions, a pair of contact members supported unattached within a first portion of said housing, a movable conductive shorting member within said first housing portion adapted in one position to interconnect said contact members and in a second position to disconnect said contact members from one another, a single channel extending longitudinally of and completely through said other housing portion and across said shorting member in a plane displaced from said shorting member, said channel having a transverse partition of insulating material extending only partially thereacross intermediate its ends, whereby said channel has a portion extending unobstructedly for the length of said casing and adapted to receive one uninterrupted conductor of said line, and has a further portion separated into two parts by said partition and adapted to accommodate the other conductor of said line cut in two portions having adjacent unstripped ends and with said partition interposed between said adjacent ends, each of said contact members having integral conductor-insulation-piercing means in alignment with said channel and overlying the portion of said channel in which said partition is interposed upon assembly of said two housing portions, whereby upon assembly of said switch with said line said insulation-piercng means are adapted to engage respectvely the two portions of said cut conductor to pierce the insulation thereof and make electrical contact with the wire thereof so that said shorting member will then be adapted to switch the flow of current along said line on and off.

2. A switch and line combination comprising a housing having first and second portions, a pair of spaced integral contact members seated unattached within said first housing portion each of said contact members being formed of a bent resilient strip of conductive material having a contact-making portion at one end and having an integral insulation piercing point at the other end in the plane of said strip, a rotatable insulating actuating member pivotally mounted in said first housing portion and having a portion thereof intermediate said contact-making portions of said contact members, and adapted to insulate said contact members from one another, a conductive shorting member mounted on and extending substantially diametrically of said actuating member portion and adapted in one position of said actuating member to interconnect said contacts and in a second position to disconnect said contacts from one another, said first housing portion having an aperture in its external wall and said actuating member extending outwardly of said aperture to permit manipulation thereof exteriorly of said housing, said second housing portion having a two-conductor-line-receiving channel with a transverse insulating partition extending partially there across, an insulated two-conductor line cord having one of its conductors cut in two parts and the other conductor integral, said line cord being positioned in said channel with said partition interposed between the ends of said two parts, said second housing portion and line cord being positioned with respect to said first housing portion and contact members so that said insulation-piercing points of said contact members are in alignment with said cut conductor of said line cord and respectively engage the parts of said cut conductor, and a pair of spring clips retaining said first housing portion in engagement with said second housing portion and with said insulation-piercing points piercing the insulation of said cut conductor parts to make electrical contact with the wire thereof, whereby upon rotation of said actuating member said shorting member is adapted to switch the flow of current along said line on and off.

3. A switch adapted for connection to a two-conductor line comprising a housing having first and second portions, a pair of spaced contact members within said first housing portion each of said contact members being formed of a single bent resilient strip of conductive material having a contact-making portion at one end and having an insulation piercing point at the other end, a rotatable insulating actuating member pivotally mounted in said first housing portion and having a portion thereof intermediate said contact-making portions of said contact members, and adapted to insulate said contact members from one another, a conductive shorting member mounted on and extending substantially diametrically of said actuating member portion and adapted in one position of said actuating member to interconnect said contacts and in a second position to disconnect said contacts from one another, said first housing portion having an aperture in its external wall and said actuating member extending outwardly of said aperture to permit manipulation thereof exteriorly of said housing, said second housing portion having a two-conductor-line-receiving channel with a transverse insulating partition extending partially there across, said partition being adapted to separate and insulate the adjacent ends of one of the conductors of a line when said one conductor is cut in two parts, said second housing portion being positioned with respect to said first housing portion and contact members so that said insulation-piercing points of said contact members are in alignment with the portion of said channel having said partition thereacross, and a pair of spring clips retaining said first housing portion in engagement with said second housing portion, whereby upon rotation of said actuating member said shorting member is adapted to switch the flow of current along said line on and off.

4. A switch adapted for connection to a two conductor line comprising a housing having first and second portions, a pair of spaced contact members within said first housing portion, each of said contact members being formed of a single bent resilient strip of conducting material having a contact making portion at one end and having an insulation piercing point at the other end, a rotatable insulating actuating member pivotally mounted in said first housing portion and having a portion thereof intermediate said contact making portions of said contact members, and adapted to insulate said contact members from one another, a conductive shorting member mounted on and extending substantially diametrically of said actuating member portion and adapted in one position of said actuating member to interconnect said contacts and in a second position to disconnect said contacts from one another, said first housing portion having an aperture in its external wall and said actuating member extending outwardly of said aperture to permit manipulation thereof exteriorly of said housing, said second housing portion having a two conductor line receiving channel with a transverse insulating partition extending partially thereacross, said partition being adapted to separate and insulate the adjacent ends of one of the conductors of a line when said one conductor is cut into two parts, said second housing portion being positioned with respect to said first housing portion and contact members so that said insulating piercing point of said contact members are in alignment with a portion of said channel having said partition thereacross, whereby upon rotation of said actuating member said shorting member is adapted to switch the flow of current along the said line on and off.

5. An electric switch adapted for connection intermediate the ends of a two-conductor line, comprising an insulating housing having a pair of portions, a pair of contact members within a first portion of said housing, a rotatable conductive short-circuiting member within said first housing portion adapted in one position to interconnect said contact members and in a second position to disconnect said contact members from one another, an actuating member secured to said rotatable short-circuiting member for rotation therewith, a single rectilinear channel extending longitudinally of and completely through said other housing portion and intersecting the axis of rotation of said actuating and short-circuiting members and spaced axially from said members, said channel having a transverse partition of insulating material extending partially thereacross intermediate its ends, whereby said channel has a portion extending unobstructively through the length of said housing and adapted to receive one uninterrupted conductor of said line and has a further contiguous portion separated into two parts by said partition and adapted to accommodate the other conductor of said line when cut in two portions and having its adjacent ends with said partition interposed therebetween, each of said contact members having means in alignment with said further contiguous portion of said channel upon juxtaposition of said housing portions for connection to the respective ends of said cut conductor.

References Cited in the file of this patent

UNITED STATES PATENTS

| | | |
|---|---|---|
| 1,165,089 | Graf | Dec. 21, 1915 |
| 1,353,124 | Klein | Sept. 14, 1920 |
| 1,704,625 | Nero | Mar. 5, 1929 |
| 1,714,708 | Winning | May 28, 1929 |
| 1,908,441 | Paiste | May 9, 1933 |
| 2,408,045 | Cottrell | Sept. 24, 1946 |
| 2,415,858 | Youhouse | Feb. 18, 1947 |
| 2,439,500 | Wood | Apr. 13, 1948 |
| 2,454,540 | Benander | Nov. 23, 1948 |